(12) United States Patent
Marks, III et al.

(10) Patent No.: US 6,632,499 B1
(45) Date of Patent: Oct. 14, 2003

(54) HUNTER CAMOUFLAGE SYSTEM

(75) Inventors: Pierce E. Marks, III, Augusta, GA (US); David H. Gibbs, Aiken, SC (US)

(73) Assignee: Peel-Scape Partners, Augusta, GA (US)

(*) Notice: Subject to any disclaimer, the term of this patent is extended or adjusted under 35 U.S.C. 154(b) by 0 days.

(21) Appl. No.: 10/141,214

(22) Filed: May 6, 2002

(51) Int. Cl.⁷ .............................................. B32B 33/00
(52) U.S. Cl. ................... 428/42.1; 428/317.5; 442/121; 442/151; 442/328; 2/206
(58) Field of Search ............................. 428/42.1, 317.5; 2/206; 442/151, 328, 121

(56) References Cited

U.S. PATENT DOCUMENTS

| | | | |
|---|---|---|---|
| 4,719,909 A | 1/1988 | Micchia et al. ............. 128/156 |
| 4,748,061 A | 5/1988 | Vesley ......................... 428/40 |
| 4,783,350 A | 11/1988 | DeMatteo et al. ............ 428/16 |
| 5,025,507 A | * 6/1991 | Kirby ............................ 2/206 |
| 5,066,529 A | 11/1991 | Huber et al. ................. 428/40 |
| 5,229,121 A | 7/1993 | Razzano et al. ............. 424/401 |
| 5,549,938 A | 8/1996 | Nesbitt ........................ 428/17 |
| 5,697,105 A | * 12/1997 | White ............................ 2/206 |
| 6,070,578 A | * 6/2000 | Baughman et al. ..... 128/205.27 |
| 6,074,721 A | 6/2000 | Moore et al. ............... 428/42.1 |
| 6,161,554 A | 12/2000 | Dunlap-Harris ............. 132/216 |
| 6,269,489 B1 | * 8/2001 | Heath ............................ 2/173 |
| 2002/0069449 A1 | * 6/2002 | Blutstein et al. |

FOREIGN PATENT DOCUMENTS

JP  2001-11779  * 1/2001  ............. D06P/3/24

* cited by examiner

Primary Examiner—Deborah Jones
Assistant Examiner—Vivek Koppikar
(74) Attorney, Agent, or Firm—Michael S. Neustel

(57) ABSTRACT

A hunter camouflage system for temporarily camouflaging a hunter's face and neck. The hunter camouflage system includes a sheet member, a plurality of camouflage members each having an exterior surface, and a layer of adhesive attached to an inner surface of the camouflage members. The camouflage members are comprised of a porous, breathable and stretchable material. The adhesive is preferably comprised of a pressure sensitive adhesive that is hypoallergenic and breathable. The sheet member includes a facial outline with the camouflage members appropriately placed within the facial outline representing the corresponding locations upon the user's face and neck that the camouflage members are to be applied thereto. The camouflage members preferably include a scent absorbing composition such as coal-based activated carbon.

20 Claims, 7 Drawing Sheets

HUNTER CAMOUFLAGE SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to hunter camouflage and more specifically it relates to a hunter camouflage system for temporarily camouflaging a hunter's face and neck in an effective manner.

2. Description of the Related Art

Camouflage for hunters have been in use for years. All forms of camouflage attempt to recreate an outdoor background design common to a geographic location where the hunter is located. Various designs (e.g. leaf, grass, corn, etc.) and colors (e.g. green, black, olive, tan, brown, etc.) are typically utilized to form the camouflage design.

One form of temporary camouflage utilized by hunters is comprised of a paint applied to the skin of the hunter. The paint is directly applied to the skin of the hunter in exposed areas to form a desired camouflage pattern. The main problem with camouflage face paint is that it does not "breath" and thereby blocks the pores of the skin. Another problem with camouflage face paint is that it may become worn off or damaged over time. A further problem with camouflage face paint is that it is difficult to manually create a desired camouflage pattern upon the hunter's skin. Another problem with camouflage face paint is that it is time consuming to apply to the hunter's skin and often times requires another individual to assist with the application. A further problem with camouflage face paint is that it requires the usage of soap and water to fully remove the paint from the skin, sometimes requiring makeup remover to fully remove the paint.

Another type of camouflage system is comprised of a "temporary tattoo" system currently manufactured by FACE-OFF CAMOUFLAGE LLC under the brand name FACE-OFF CAMO that is comprised of a rectangular sheet with a solid camouflage design and a transparent cover sheet. The temporary tattoo system requires the user to cut a desired pattern that fits the hunter's face. The user must then remove the transparent cover sheet and then press the camouflage pattern firmly upon the skin. The user then must simultaneously apply water to the back surface of the camouflage pattern thoroughly and then wait approximately 30 seconds before removing the sheet. To remove the temporary tattoo from the skin, the user must apply household rubbing alcohol or baby oil to the skin. The temporary tattoo system has various detriments similar to camouflage painting systems including requiring significant amounts of time to prepare and apply along with removal thereof.

Examples of patented devices which are related to the present invention include U.S. Pat. No. 5,066,529 to Huber et al.; U.S. Pat. No. 4,748,061 to Vesley; U.S. Pat. No. 4,783,350 to DeMatteo et al.; U.S. Pat. No. 4,719,909 to Micchia et al.; U.S. Pat. No. 5,549,938 to Nesbitt; U.S. Pat. No. 6,161,554 to Dunlap-Harris; U.S. Pat. No. 5,229,121 to Razzano et al.; U.S. Pat. No. 6,074,721 to Moore et al.

U.S. Pat. No. 4,719,909 illustrates non-glaring strips commonly utilized by athletes in sports such as baseball and football to prevent "glaring" of the sun from the upper cheek portions. The non-glaring strips are comprised a kidney shaped structure having a pressure sensitive adhesive that are removably retained upon a storage sheet.

While these devices may be suitable for the particular purpose to which they address, they are not as suitable for temporarily camouflaging a hunter's face and neck. Conventional camouflage devices are difficult to utilize and do not allow the hunter's skin to breath.

In these respects, the hunter camouflage system according to the present invention substantially departs from the conventional concepts and designs of the prior art, and in so doing provides an apparatus primarily developed for the purpose of temporarily camouflaging a hunter's face and neck.

BRIEF SUMMARY OF THE INVENTION

In view of the foregoing disadvantages inherent in the known types of camouflage now present in the prior art, the present invention provides a new hunter camouflage system construction wherein the same can be utilized for temporarily camouflaging a hunter's face and neck.

The general purpose of the present invention, which will be described subsequently in greater detail, is to provide a new hunter camouflage system that has many of the advantages of the camouflage mentioned heretofore and many novel features that result in a new hunter camouflage system which is not anticipated, rendered obvious, suggested, or even implied by any of the prior art camouflage devices, either alone or in any combination thereof.

To attain this, the present invention generally comprises a sheet member, a plurality of camouflage members each having an exterior surface, and a layer of adhesive attached to an inner surface of the camouflage members. The camouflage members are comprised of a porous, breathable and stretchable material. The adhesive is preferably comprised of a pressure sensitive adhesive that is hypoallergenic and breathable. The sheet member includes a facial outline with the camouflage members appropriately placed within the facial outline representing the corresponding locations upon the user's face and neck that the camouflage members are to be applied thereto. The camouflage members preferably include a scent absorbing composition such as coal-based activated carbon.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a hunter camouflage system that will overcome the shortcomings of the prior art devices.

A second object is to provide a hunter camouflage system for temporarily camouflaging a hunter's face and neck.

Another object is to provide a hunter camouflage system that is easily applied to a user's face and neck and easily removed from thereof.

An additional object is to provide a hunter camouflage system that indicates the desirable locations to attach specific camouflage members.

A further object is to provide a hunter camouflage system that is breathable and hypoallergenic.

Another object is to provide a hunter camouflage system that stretches to allow for body movements.

A further object is to provide a hunter camouflage system that may be utilized by individuals within the armed forces, police, paintball players or any other activity requiring camouflaged concealment.

Another object is to provide a hunter camouflage system that reduces irritation to the skin.

A further object is to provide a hunter camouflage system that does not require the usage of chemicals for removal thereof from the skin.

Another object is to provide a hunter camouflage system is not susceptible to smearing or eye contamination.

An additional object is to provide a hunter camouflage system that does not interfere with the user's physical movements and visibility.

A further object is to provide a hunter camouflage system that reduces the scent of a human to animals.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
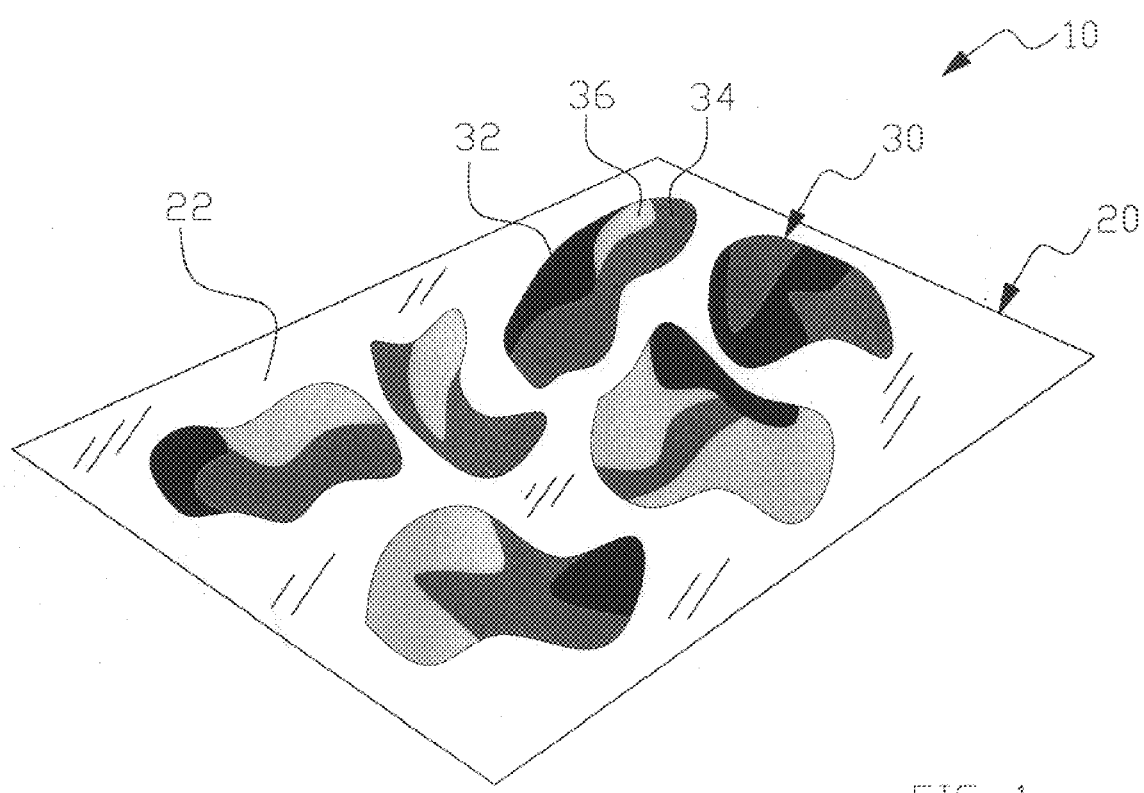
FIG. 1 is an upper perspective view of the sheet member with a plurality of camouflage members arbitrarily positioned upon thereof.

Turning now descriptively to the drawings, in which similar reference characters denote similar elements throughout the several views, FIGS. 1 through 7 illustrate a hunter camouflage system 10, which comprises a sheet member 20, a plurality of camouflage members 30 each having an exterior surface 31, and a layer of adhesive 33 attached to an inner surface of the camouflage members 30. The camouflage members 30 are comprised of a porous, breathable and stretchable material. The adhesive 33 is preferably comprised of a pressure sensitive adhesive 33 that is hypoallergenic and breathable. The sheet member 20 includes a facial outline 26 with the camouflage members 30 appropriately placed within the facial outline 26 representing the corresponding locations upon the user's face and neck that the camouflage members 30 are to be applied thereto. The camouflage members 30 preferably include a scent absorbing composition such as coal-based activated carbon.

As shown in FIGS. 1 through 7 of the drawings, the sheet member 20 is preferably comprised of a flat structure having an upper surface 22 and a lower surface 24. The sheet member 20 may be flexible, semi-flexible or non-flexible depending upon the desired usage. The sheet member 20 may be comprised of various shapes including but not limited to the shape of a human head, square, rectangular, oval and circular. The upper surface 22 of the sheet member 20 is comprised of a material capable of removably receiving an adhesive 33, such as acrylate-based, without damaging the adhesive 33 characteristics of the adhesive 33 such as carrier sheets commonly utilized within the label industry.

Figure 5:
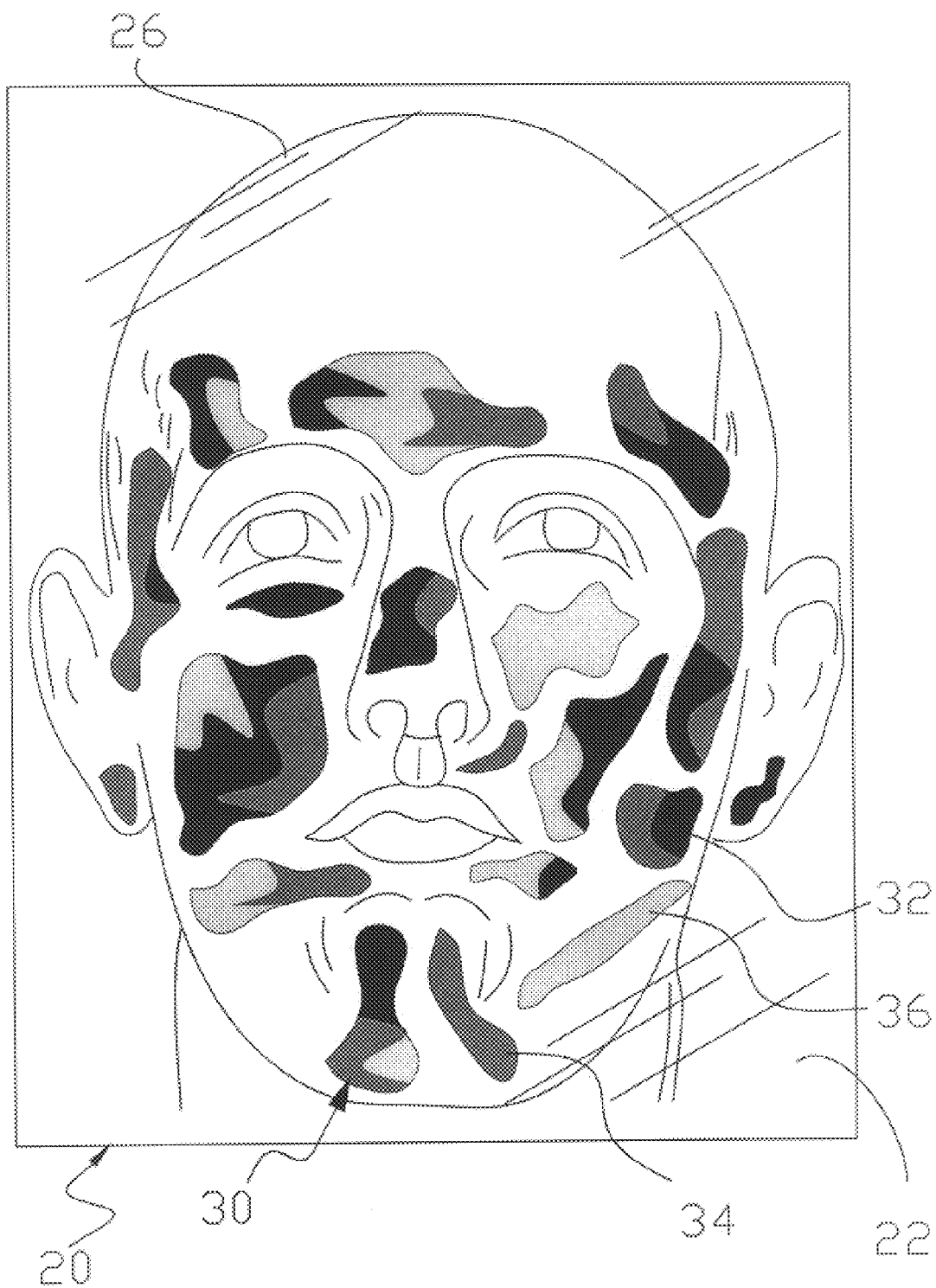
FIG. 5 is a top view of the sheet member with a front facial outline.
Figure 6:
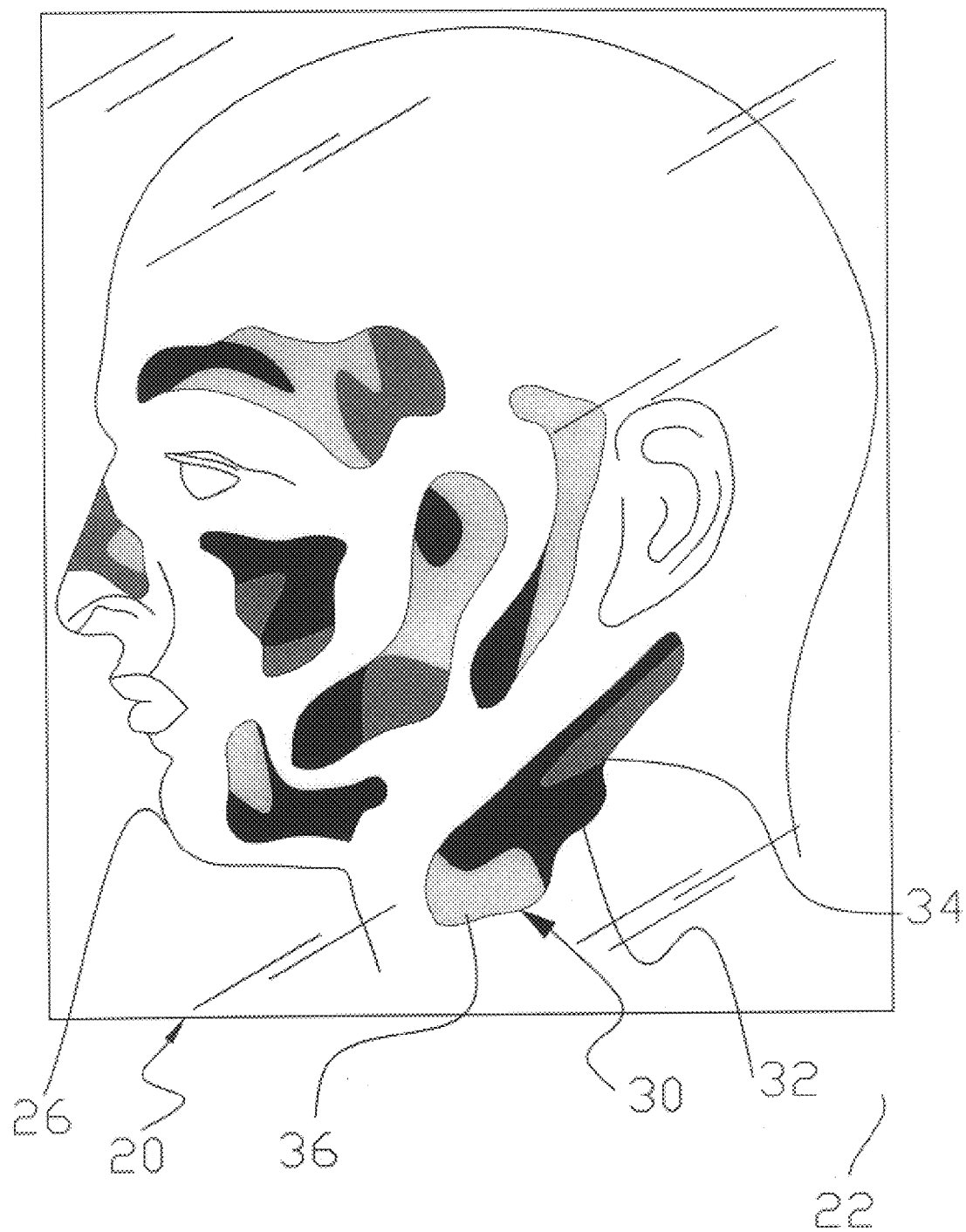
FIG. 6 is a top view of the sheet member with a side facial outline.
Figure 7:
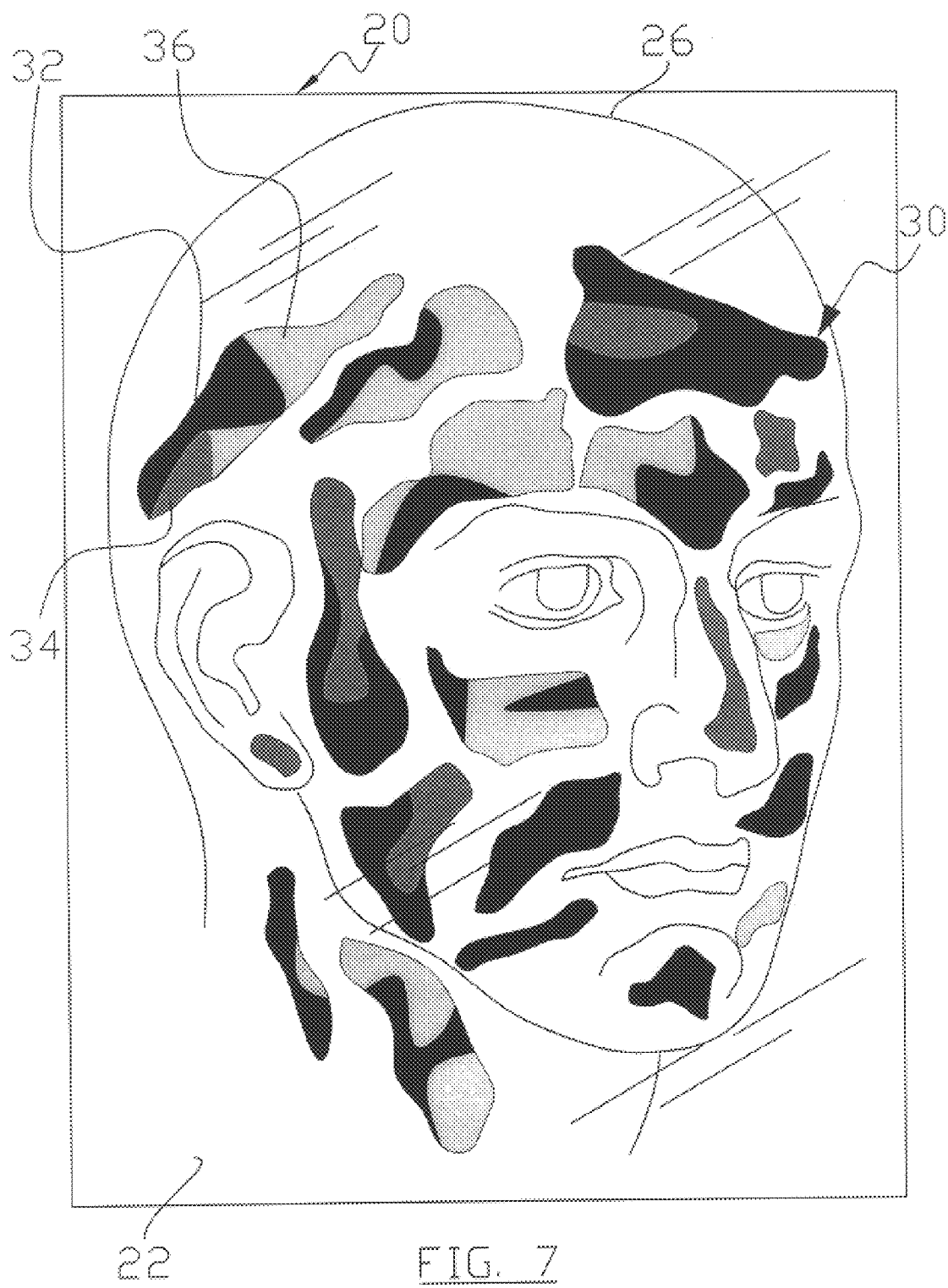
FIG. 7 is a top view of the sheet member with a perspective facial outline.

The upper surface 22 of the sheet member 20 preferably includes a facial outline 26 that preferably includes the facial and neck features of a human as shown in FIGS. 5 through 7 of the drawings. The facial outline 26 preferably includes indicia representing the eyes, forehead, ears, cheeks, nose, mouth, chin, neck and other readily apparent facial features. The facial outline 26 may be comprised of a front view of the human face (FIG. 5), a side view of the human face (FIG. 6) or a perspective view of the human face (FIG. 7). The camouflage members 30 are removably attached upon the upper surface 22 of the sheet member 20 within the facial outline 26 within the desired locations thereof as shown in FIGS. 5 through 7 of the drawings.

Figure 2:
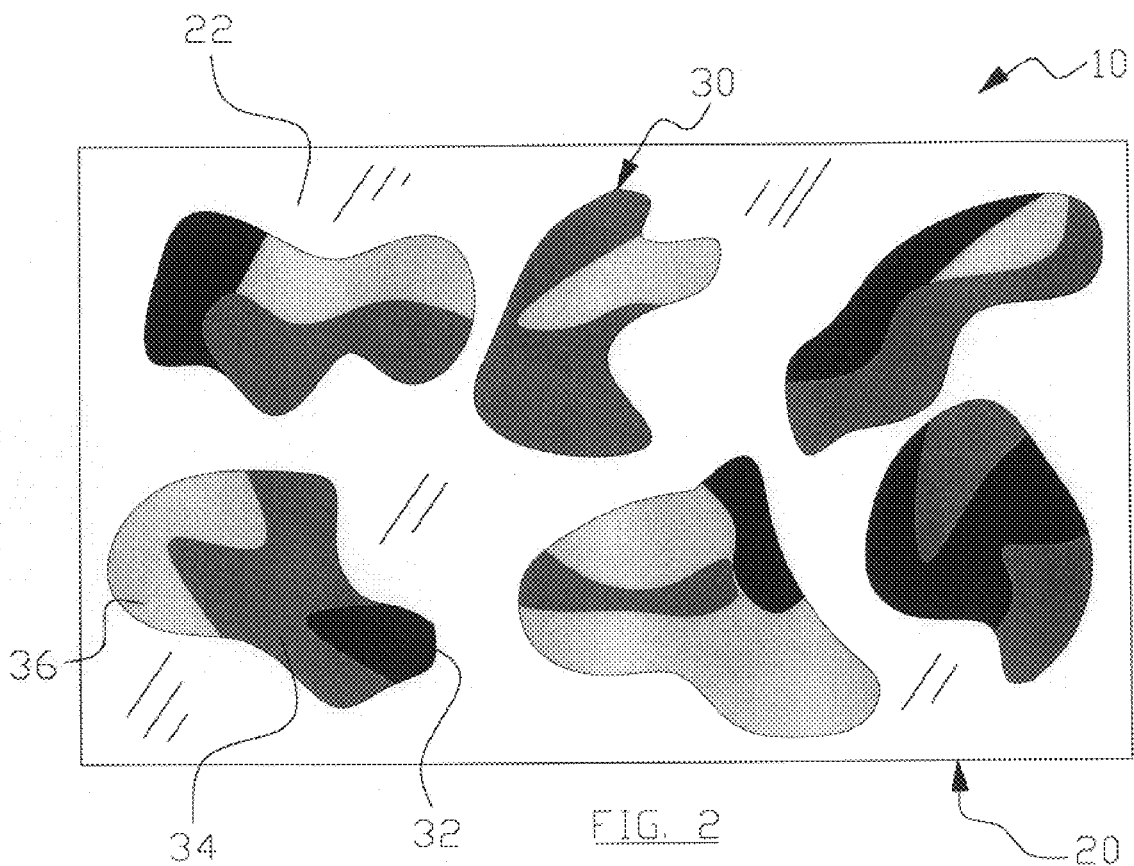
FIG. 2 is a top view of the camouflage members upon the sheet member.
Figure 3:
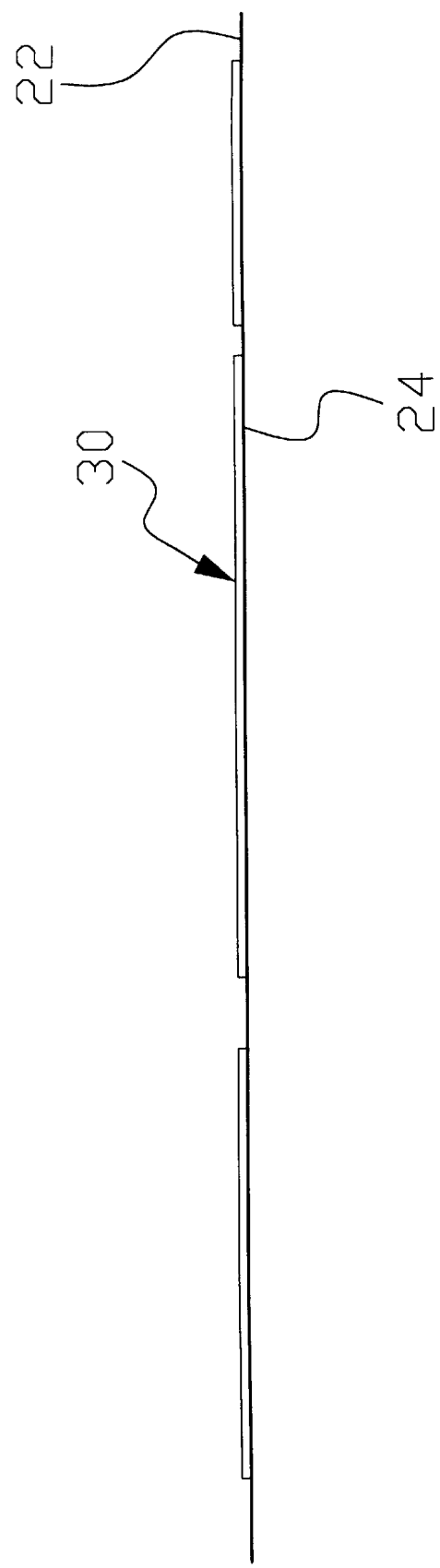
FIG. 3 is a side view of the camouflage members upon the sheet member.

The camouflage members 30 each have an exterior surface 31 comprising a camouflage design and shape as shown in FIGS. 1, 2, 5, 6 and 7 of the drawings. The exterior surface 31 of the camouflage members 30 is preferably comprised of a rough and irregular texture. The camouflage design may be comprised of one segment or multiple segments which are commonly utilized within camouflage designs. FIGS. 1 and 2 illustrate the usage of camouflage members 30 having a first segment 32, a second segment 34 and a third segment 36. The camouflage design upon the exterior surface 31 of the camouflage members 30 may have various colors, shading and designs.

The shapes and sizes of the camouflage members 30 preferably vary depending upon the location upon the face and neck to be positioned as shown in FIGS. 1, 2, 5, 6 and 7 of the drawings. For example, for covering the side portion of the neck and elongate structure with a broader base structure may be used as shown in FIG. 6 of the drawings. Various shapes including but not limited to elongated, curved, rounded, polygonal, oblong and various other shapes may be utilized to construct the camouflage members 30. The shapes and sizes of the camouflage members 30 are not designed to cover the entire skin surface of the hunter, but rather to merely break-up the overall facial appearance of the hunter while providing a desired level of comfort to the hunter. The camouflage designs and shapes illustrated within FIGS. 1, 2, 5, 6 and 7 of the drawings are merely for illustration purposes only and should not limit the scope of the present invention.

The camouflage members 30 are preferably comprised of a porous, breathable and hypoallergenic material such as but not limited to a fabric, tissue or plastic. The camouflage members 30 allow for the passage of gases and liquids from and to the skin. The camouflage members 30 may be comprised of but not limited non-woven polyester commonly utilized within the medical industry as surgical tape and other medical applications. The camouflage members 30 preferably are also comprised of a stretchable and flexible material that allows for the movement of the body without significant stress being applied to the camouflage member or the skin. The camouflage members 30 may be preformed to the desired shapes or die cut to the desired shapes.

Each of the camouflage members 30 preferably includes a human scent reduction/absorption material within such as but not limited to a carbon coating or coal-based activated carbon commonly utilized within the hunting industry upon hunting apparel. The human scent reduction/absorption material reduces the scent of the hunter detectable by a game animal.

Figure 4:
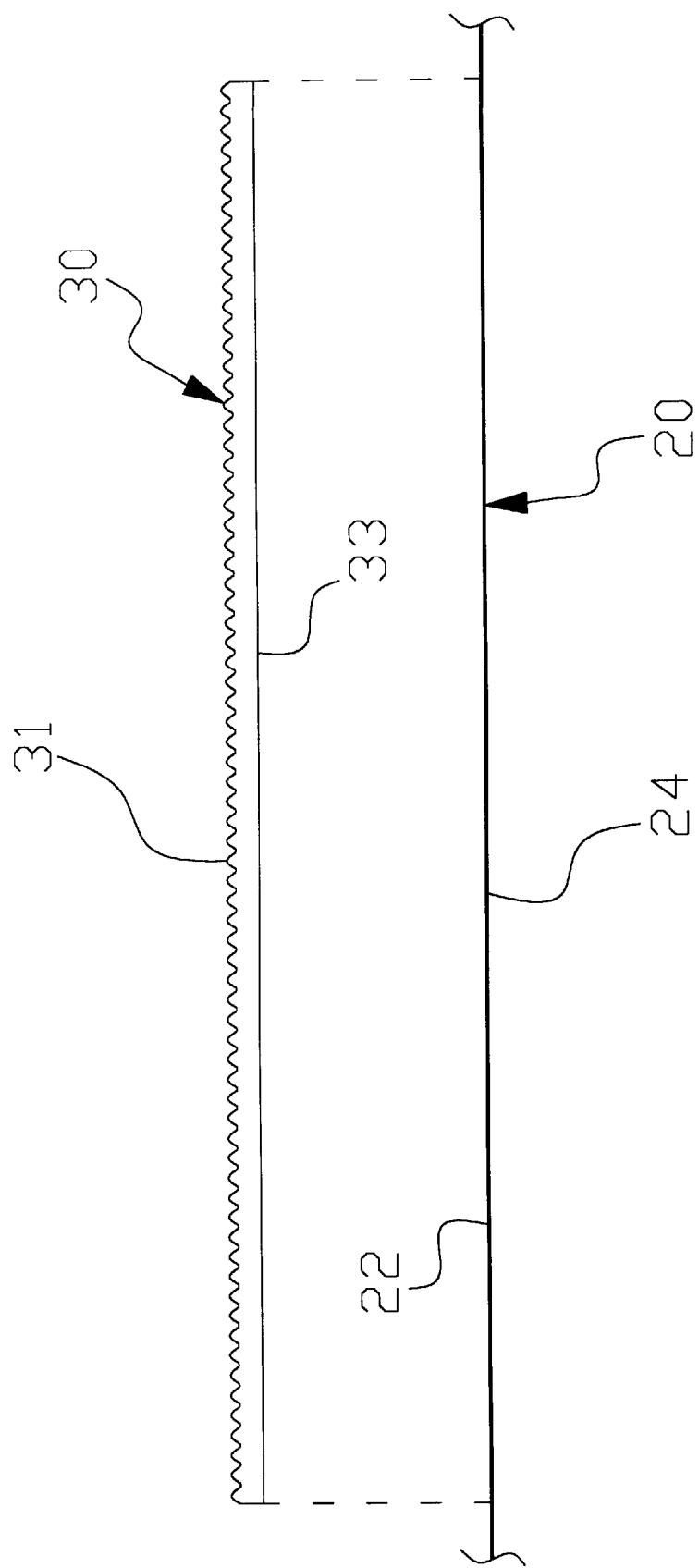
FIG. 4 is an exploded view of a camouflage member with respect to the sheet member.

The camouflage members 30 each include an adhesive 33 attached to the inner surface of the camouflage members 30 opposite of the exterior surface 31 as shown in FIG. 4 of the drawings. The adhesive 33 allows for removable and secure attachment of the camouflage members 30 to the skin of a user during various types of weather conditions. The adhesive 33 is preferably pressure sensitive, porous, breathable and hypoallergenic. The adhesive 33 is preferably comprised of but not limited to an acrylate-based material commonly utilized within the medical industry for surgical tape and other medical applications. Various other types of material may be utilized as the adhesive 33.

In use, the user views the sheet member 20 containing the camouflage members 30 upon to determine the corresponding locations upon the face and neck desired to be covered as shown in FIGS. 5, 6 and 7 of the drawings. For example, the user may start with applying the camouflage members 30 around the upper portion of the face and thereby would remove the corresponding camouflage members 30 from the upper portion of the facial outline 26 and then apply the same to the corresponding location upon their face. The user presses upon the camouflage members 30 attached to the skin to ensure proper attachment of the adhesive 33 to the skin. This process continues until the user has covered their facial features to the desired level. After the user has finished performing the activity requiring the camouflaging of the face, the user then may remove the camouflage members 30 from the face by simply grasping a portion thereof and removing from the skin. The camouflage members 30 may then be. discarded or potentially reused by reattaching to the sheet member 20.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A hunter camouflage system having a plurality of camouflage members, each of said camouflage members comprising:

an exterior surface having a camouflage design;

an adhesive attached to an inner surface of said camouflage members, wherein said adhesive is porous;

wherein said camouflage members are comprised of a porous material;

a sheet member having an upper surface, wherein said camouflage members are removably attached to said upper surface of said sheet member; and a facial outline upon said upper surface of said sheet member, wherein said camouflage members are attached within representative locations within said facial outline.

2. The hunter camouflage system of claim 1, wherein said camouflage members are comprised of a fabric.

3. The hunter camouflage system of claim 2, wherein said camouflage members are comprised of a non-woven polyester material.

4. The hunter camouflage system of claim 1, wherein said camouflage members are comprised of a stretchable material.

5. The hunter camouflage system of claim 1, wherein said exterior surface has a rough texture.

6. The hunter camouflage system of claim 1, wherein said plurality of camouflage members have differing perimeter shapes.

7. The hunter camouflage system of claim 1, wherein said adhesive is comprised of a pressure sensitive material.

8. The hunter camouflage system of claim 1, wherein said adhesive is comprised of an acrylate-based material.

9. A hunter camouflage system having a plurality of camouflage members, each of said camouflage members comprising:

an exterior surface having a camouflage design;

an adhesive attached to an inner surface of said camouflage members, wherein said adhesive is porous;

wherein said camouflage members are comprised of a porous material;

a scent reducing material within said camouflage members;

a sheet member having an upper surface, wherein said camouflage members are removably attached to said upper surface of said sheet member; and a facial outline upon said upper surface of said sheet member, wherein said camouflage members are attached within representative locations within said facial outline.

10. The hunter camouflage system of claim 9, wherein said camouflage members are comprised of a fabric.

11. The hunter camouflage system of claim 10, wherein said camouflage. members are comprised of a non-woven polyester material.

12. The hunter camouflage system of claim 9, wherein said camouflage members are comprised of a stretchable material.

13. The hunter camouflage system of claim 9, wherein said exterior surface has a rough texture.

14. The hunter camouflage system of claim 9, wherein said plurality of camouflage members have differing perimeter shapes.

15. The hunter camouflage system of claim 9, wherein said adhesive is comprised of a pressure sensitive material.

16. The hunter camouflage system of claim 9, wherein said scent reducing material is comprised of a coal-based activated carbon.

17. A method of applying a plurality of camouflage members to a human face, each of said camouflage members having an exterior surface having a camouflage design and a porous structure, and an adhesive which is porous attached to an inner surface of said camouflage members, and including a sheet member having an upper surface wherein said camouflage members are removably attached to said upper surface of said sheet member, and a facial outline upon said upper surface of said sheet member, wherein said camouflage members are attached within representative locations within said facial outline, said method comprising the steps of:

(a) determining a location upon said human face to be camouflaged;

(b) locating a corresponding representative location upon said facial outline of said sheet member;

(c) removing a corresponding camouflage member within said corresponding representative location of said sheet member; and (d) applying said corresponding camouflage member to said location upon said human face.

18. The hunter camouflage system of claim 1, wherein said camouflage members are comprised of a fabric.

19. The hunter camouflage system of claim 2, wherein said camouflage members are comprised of a non-woven polyester material.

20. The hunter camouflage system of claim 1, wherein said camouflage members are comprised of a stretchable material.

* * * * *